July 5, 1966  R. W. KLEMM  3,259,420
SELF-UNLOADING HOOK
Filed June 10, 1964
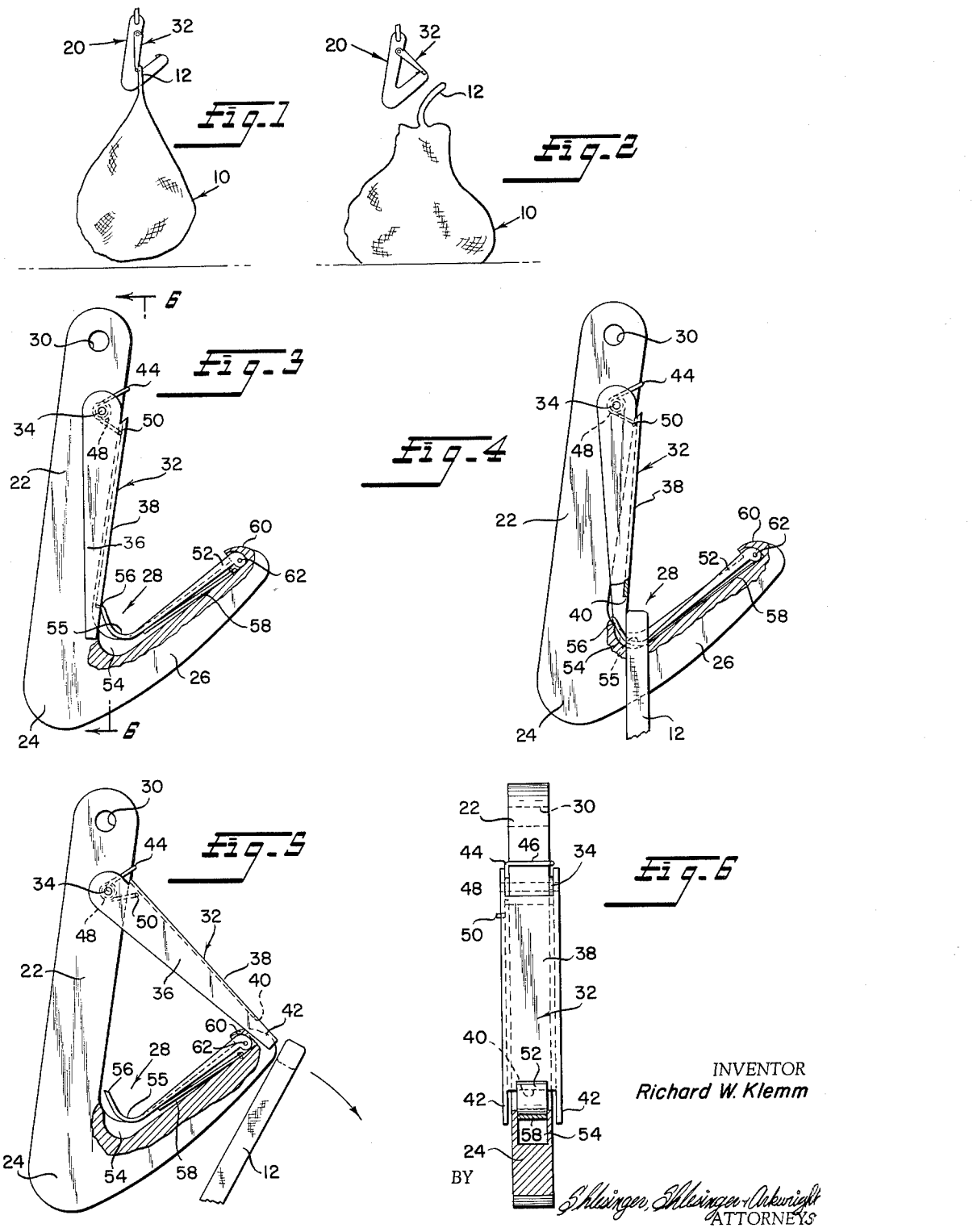
INVENTOR
Richard W. Klemm
BY
Shlesinger, Shlesinger & Arkwright
ATTORNEYS

United States Patent Office 3,259,420
Patented July 5, 1966

3,259,420
SELF UNLOADING HOOK
Richard W. Klemm, Silver Spring, Md.
(7 Olde Coach Road, Colonial Acres, Glenmont, N.Y.)
Filed June 10, 1964, Ser. No. 374,090
12 Claims. (Cl. 294—83)

This invention relates to a self unloading hook.

It is often desirable to quickly and automatically release a laundry bag or other cargo which utilizes a rope for handling. For example, laundry in separate bags is carried from one location to another by means of overhead conveyors with depending hooks. It is often desirable to be able to automatically eject the rope from the hook as soon as the bag is lowered to a table or floor and tension is released on the rope.

It is an object of the instant invention to provide a hook which quickly and automatically ejects a rope from the throat of the hook when tension on the rope is released.

It is a further object to provide a hook having an ejector which may be cocked prior to placing a rope in the throat of the hook.

In a preferred embodiment of the invention a conventionally shaped hook is provided with an ejector which is pivotally mounted on the shank of the hook. This ejector will swing outwardly of the shank under pressure from a bias means and force an untensioned rope off the end of the angularly extending portion. The device further includes a retainer which holds the ejector in place prior to placing a load in the throat.

Other objects, advantages, and features of the invention will appear obvious and the invention may be better understood from the accompanying drawings, detailed descriptions and the appended claims wherein:

FIGURE 1 is a side elevation view of the hook with a bag carried thereon;

FIGURE 2 is a side elevation view of the hook as the tension on the rope is released and the rope is ejected from the throat of the hook;

FIGURE 3 is a side elevation view partly in section showing the hook in its cocked position;

FIGURE 4 is a side elevation view partly in section of the hook as shown when a tensioned rope is placed in the throat;

FIGURE 5 is a side elevation view partly in section showing the rope being ejected from the throat of the hook;

FIGURE 6 is a sectional view taken along 6—6 of FIGURE 3;

Referring now to FIGURE 1 of the drawings it will be noted that a laundry bag or the like indicated at 10 having a rope or strap 12 is hung from a conveyor (not shown) by means of a hook 20.

The hook as seen in FIGURES 3 through 6 comprises a shank portion 22, a bight portion 24 connected to the shank and an angularly extending portion 26 connected to the bight. These members form a hook shaped member having a throat indicated at 28.

The shank portion 22 may be provided with a through hole 30 which is used to hang the hook from a conveyor system or the like.

Mounted on the shank 22 is an ejector 32 which is pivotally mounted on a pin 34. The ejector is formed from a U-shaped piece of material having upstanding portions 36 and a transverse connecting portion 38.

The transverse portion terminates at a point 40 adjacent the bight. The upstanding portions 36 have two depending arms 42 extending along the side of the bight adjacent the throat. The purpose of members 40 and 42 will become apparent below.

The ejector is further provided with a biasing means indicated as a spring 44. The spring 44 obtains its biasing pressure by transverse portion 46 engaging the shank and having a curved portion 48 wrapped around a portion of pin 34 and having a biased pressure means on the ejector at 50.

A retainer 52 may be mounted in a depression 54 in the angularly extending portion and bight portion. The retainer 52 acts against the ejector 32 at a point just above and including the terminating portion 40. This is best seen in FIGURE 3.

The retainer is provided with a curved area 55 conforming to the bight, a cammed surface 56 and a bias means shown as a leaf spring 58. A stop means shown at 60 which is in the form of an overhanging projection limits the outward movement of the retainer 52.

While the cam surface 56 is shown on the retainer it could be located on the ejector. The retainer is shown as being pivoted on a pin 62 located on the angularly extending portion at a point remote from the bight. The bias spring 58 may be rigidly secured to the angularly extending portion at a point adjacent the pin 62.

Operation

When it is desired to place a bag on the hook the ejector 32 will originally be in its outward position as seen in FIGURES 2 and 5. The operator first returns the ejector to its flush position as seen in FIGURES 3 and 4. This is done against the force of spring 44. The retainer 52 is biased outwardly by means of spring 58. The terminal portion 40 of the ejector slides over the cammed surface 56, forcing the retainer sufficiently downward to allow the ejector to pass over it.

The retainer then moves into its position as seen in FIGURE 3 holding the ejector in its cocked position.

The operator then places the rope 12 over the angularly extending portion of the hook into the throat 28.

As seen in FIGURE 4 the rope pulls the retainer out of the way of ejector 32, whereby the cam surface 56 positions itself below terminal point 40.

The tension on rope 12 is the sole restraining force against the side arms or depending portions 42 of the U-shaped ejector.

When the bundle or load is lowered to the floor or table, or the tension on rope 12 is otherwise released, the ejector is able to swing forward. The depending arms 42 force the portion of the rope outwardly as these arms sweep along the side surfaces of the angularly extending portion of the hook. As is best seen in FIGURE 5, the rope then is ejected completely from the hook thus causing the automatic release of the bag or cargo.

The stop 60 prohibits the retainer 52 from being forced too high into the throat.

The hook is reset in the same manner as originally made operative, i.e., ejector 32 is forced up against the shank 22 until retainer 52 catches on terminal portion 40.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. A self unloading hook comprising:
   (a) a hook member having a shank, a bight connected to said shank and an angularly extending portion connected to said bight, said shank, bight and angularly extending portion forming a throat on the inner surface thereof,
(b) an ejector means pivotally mounted on said shank,
(c) means for outwardly biasing said ejector into said throat,
(d) a retainer having one portion mounted on said angularly extending portion, said retainer having a portion adjacent and cooperating with said ejector to selectively retain and release said ejector.

2. A hook as defined in claim 1 wherein said retainer is pivotally mounted and means is provided to outwardly bias said retainer into said throat.

3. A hook as defined in claim 1 wherein said ejector is pivotally connected to said shank at a point remote from said bight, said ejector extending along the inner surface of said shank and at least a portion of said ejector terminating at a point adjacent said bight.

4. A hook as defined in claim 1 wherein said retainer is pivotally connected to said angularly extending portion at a point remote from said bight, said retainer extending along the inner surface of said angularly extending portion and terminating at a point adjacent said bight.

5. A hook as defined in claim 1 wherein said retainer has a configuration generally conforming to said inner surface of the angularly extending portion and bight.

6. A hook as defined in claim 1 wherein said retainer further includes a cam surface at the end which retains said ejector.

7. A hook as defined in claim 1 wherein said ejector is of a substantially U-shaped cross-section.

8. A hook as defined in claim 7 wherein the upstanding portions of said U-shaped ejector extend along the sides of said bight and sweep along the sides of said angularly extending portion as the ejector is pivoted outwardly.

9. A hook as defined in claim 2 further including stop means to limit the outward pivotal movement of said retainer.

10. A hook as defined in claim 9 wherein said stop means is mounted on said angularly extending member and extends over a portion of said retainer.

11. A self unloading hook comprising:
(a) a hook member having a shank, a bight connected to said shank and an angularly extending portion connected to said bight, said shank, bight and angularly extending portion forming a throat on the inner surface thereof,
(b) an ejector means pivotally mounted on said shank at a point remote from said bight, said ejector extending along the inner surface of said shank and terminating at a point adjacent said bight, said ejector further including depending portions extending along the sides of said bight and sweep along the sides of said angularly extending portion as the ejector is pivoted outwardly,
(c) means to outwardly bias said ejector into said throat,
(d) a retainer pivotally mounted on said angularly extending portion, said retainer having its unmounted end positioned adjacent said ejector to selectively retain and release said ejector,
(e) a means to outwardly bias said retainer into said throat.

12. A self unloading hook comprising:
(a) hook member having a shank, a bight connected to said shank and an angularly extending portion connected to said bight, said shank, bight and angularly extending portion forming a throat on the inner surface thereof,
(b) an ejector means pivotally mounted on said shank at a point remote from said bight,
(c) means to outwardly bias said ejector into said throat,
(d) means to cock said ejector in a position adjacent said shank, said cocking means being movable out of cocked position when a rope or like means is placed in the bight, wherein the rope or like means retains said ejector in the cocked position as long as tension exists on the rope or like means.

References Cited by the Examiner
UNITED STATES PATENTS

| | | | |
|---|---|---|---|
| 1,994,646 | 3/1935 | Heath | 294—83 X |
| 2,831,721 | 4/1958 | Gross | 294—83 |

HUGO O. SCHULZ, *Primary Examiner.*

ROBERT G. SHERIDAN, *Examiner.*